United States Patent [19]

Katayama

[11] Patent Number: 4,837,432
[45] Date of Patent: Jun. 6, 1989

[54] OPTICAL MEASURING APPARATUS WHICH EMPLOYS TWO SYNCHRONOUSLY ROTATING MEANS TO MEASURE OBJECT

[75] Inventor: Ichiro Katayama, Tokyo, Japan

[73] Assignee: Union Tool Co., Ltd., Tokyo, Japan

[21] Appl. No.: 236,448

[22] Filed: Aug. 25, 1988

[30] Foreign Application Priority Data

Sep. 30, 1987 [JP] Japan ................................ 62-246822

[51] Int. Cl.[4] ................................................ H01J 3/14
[52] U.S. Cl. ................................ 250/235; 250/237 G;
350/6.5; 356/384
[58] Field of Search ................... 250/234, 235, 237 G,
250/560; 350/6.5, 6.9; 356/379–381, 383–387

[56] References Cited

U.S. PATENT DOCUMENTS

| | | | |
|---|---|---|---|
| 4,402,609 | 9/1983 | Fetzer et al. | 250/560 |
| 4,465,937 | 8/1984 | Forbes | 250/560 |
| 4,596,919 | 6/1986 | Kremers et al. | 356/379 |
| 4,648,718 | 3/1987 | Sadamitsu et al. | 250/560 |
| 4,692,629 | 9/1987 | Nakamura | 250/236 |

Primary Examiner—David C. Nelms
Assistant Examiner—Stephone B. Allen
Attorney, Agent, or Firm—Wenderoth, Lind & Ponack

[57] ABSTRACT

There is disclosed an optical measuring apparatus including a light scanning section for converting a light beam from a first light source to a parallel scanning light beam, a focussing section including a first focussing lens for focussing the parallel scanning light beam, an electric signal generating section for converting a focussed light to an electric signal, a measuring reference signal generating section and an electric signal processing section.

The light scanning light section comprises a first mirror and a second mirror, each of which is rotated synchronously. The measuring reference comprises a transparent scale which is rotated in synchronism with the first and second mirrors, a light source, a second focussing lens and a second photoelectric conversion element. The electric signal processing section processes the electric signal from the electric signal generating section based on the measuring reference signal.

1 Claim, 3 Drawing Sheets

OPTICAL MEASURING APPARATUS WHICH EMPLOYS TWO SYNCHRONOUSLY ROTATING MEANS TO MEASURE OBJECT

BACKGROUND OF THE INVENTION

The present invention relates to an optical measuring apparatus, and more particularly to a self-scanning type optical measuring apparatus which is used to measure a dimension, a shape and the like of an object to be measured.

Recently, various optical measuring apparatus have been developed and known in the art in which optical instruments are employed. The optical instrument usually employs a self-scanning type photoelectric conversion element including a photoelectric conversion element array which is composed of a plurality of individual photoelectric detecting elements. The photoelectric conversion element is arranged at a position equivalent to the detecting plane. An object to be measured is scanned by a parallel light beam, and thereby the photoelectric detecting elements are optically scanned to obtain electrical values corresponding to the dimension and the shape of the object to be measured. In the measurement of the dimension and the shape of the object by the optical scanning, the most basic and important problem is to obtain a parallel light beam.

FIG. 5 shows a typical example of the prior art optical measuring apparatus which employs a self-scanning type optical measuring instrument. As is shown in FIG. 5, the optical measuring apparatus comprises a light source in the form of a laser light generator 1, a fixed mirror 2 positioned on a light path of laser light generated by the laser light generator 1 and inclined at a predetermine angle with respect to the light path, a polygon mirror 3 positioned on a light path of a reflecting light beam from the fixed mirror 2, a drive motor 4 rotating the polygon mirror 3, a collimating lens 5 provided at a reflecting light path side of the polygon mirror 3 and spaced apart at a focal length f from the polygon mirror 3, a focussing lens 6 arranged at a predetermined distance from the collimating lens 6, a photoelectric conversion element 7 receiving rays of light focussed by focussing lens 6, a processing section 8 for processing an electrical signal produced by the photoelectric conversion element 7 and a displaying section 9 for displaying a dimension of an object m to be measured based on a processed signal of the processing section 8.

In accordance with the optical measuring apparatus of FIG. 5, the laser light beam produced by the laser light generator 1 is reflected by the fixed mirror 2. The reflected light beam is incidenced on the polygon mirror 3 and is further reflected by the polygon mirror 3. The reflecting light beam from the polygon mirror 3 is incidenced on the collimating mirror 5. The incidencing light on the collimating lens 5 is converted to a parallel light beam. The parallel light beam from the collimating lens 5 is focussed on the photoelectric conversion element 7 by means of the focussing lens 6.

When the polygon mirror 3 is rotated by the drive motor 4, the reflecting angle of the reflecting light beam from the polygon mirror 3 is varied according to the rotation angle of the polygon mirror 3, resulting that a scanning region a is decided. The object to be measured is scanned by the parallel light beam, and a shield portion is formed on the photoelectric element 7, during the parallel scanning light beam incidences to the object m. The photoelectric conversion element 7 generates an electrical signal corresponding to the shadow portion. The electrical signal produced by the photoelectric conversion element 7 is processed by the processing section 8 and the dimension of the object m is displayed on the displaying section 9 according to the electric signal from the processing section 8.

As mentioned above, the laser light beam is incidenced on polygon mirror and is diffused by the polygon mirror. The diffused light is made the scanning light beam by the collimating lens, and the electric signal is produced from the photoelectric conversion element according to the shadow portion formed thereon and is processed by the processing section.

Problems associated with the prior art optical measuring apparatus reside in that the apparatus was costly and large size, since the apparatus required an expensive polygon mirror and an expensive collimating lens, and the distance between the polygon mirror and the collimating lens must be set to four to five times of a scanning region. In addition, the circuitry of the processing section was complicated and expensive, since the compensation of the aberration of the collimating lens and the compensation of the trigonometric function were required as well as a precise number of rotation of the drive motor is required in order to obtain the accuracy of the measuring value.

SUMMARY OF THE INVENTION

It is accordingly an object of the present invention to provide an inexpensive and high performance optical measuring apparatus.

In accordance with the present invention, the optical measuring apparatus comprising a first light source for generating a light beam, a driving section for rotation including a drive motor and a supporting member rotated by the drive motor; a light scanning section for producing a parallel scanning light flux, including a first mirror fixed mounted on said supporting member of the driving section periodically receiving the section for producing a parallel scanning light flux, including a first mirror fixed mounted on said supporting member of the driving section periodically receiving the light beam from said first light source and a second mirror fixedly arranged on said supporting member horizontally vertically displaced from the first mirror such that a reflecting surface of the second mirror being parallelly opposed to a reflecting surface of the first mirror, the first mirror and the second mirror being synchronously rotated by said drive motor of the driving section; a focussing section including a first focussing lens for focussing a parallel scanning light beam produced by said light scanning section, being arranged on a light path of the parallel scanning light beam, an electric signal generating section including a first photoelectric conversion element for converting a focussed light beam focussed by said focussing lens of the focussing section to an electric signal, a measuring reference signal generating section for generating a measuring reference signal in synchronism with the generation of the parallel scanning light, said measuring reference signal generating section including a transparent scale having a plurality of scaling marks and fixedly mounted on said supporting member of the driving section together with said first and second mirrors of the light scanning section, a second light source fixedly arranged spaced apart from a rotation tracking plane, a second focussing lens fixedly positioned on a light path of a light beam between the second light source and the rotation tracking plane and a second photoelectric conversion element fixedly arranged opposed to the second focussing lens with respect to the rotation tracking plane spaced apart from the second focussing lens at a predetermined distance, an electric signal generating section for processing said electric signal of the electric signal generating section and said measuring reference signal of the measuring reference signal generating section to produce a measuring signal of the object to be measured and, an indicating section for indicating a dimension of the object based on said measuring signal of said electric signal generating section.

Other objects and further scope of applicability of the present invention will become apparent from the detailed description to follow when take in conjunction with the accompanying drawings wherein like parts are indicated by like reference numerals through out the several views.

DESCRIPTION OF THE PREFERRED EMBODIMENTS

Figure 1:
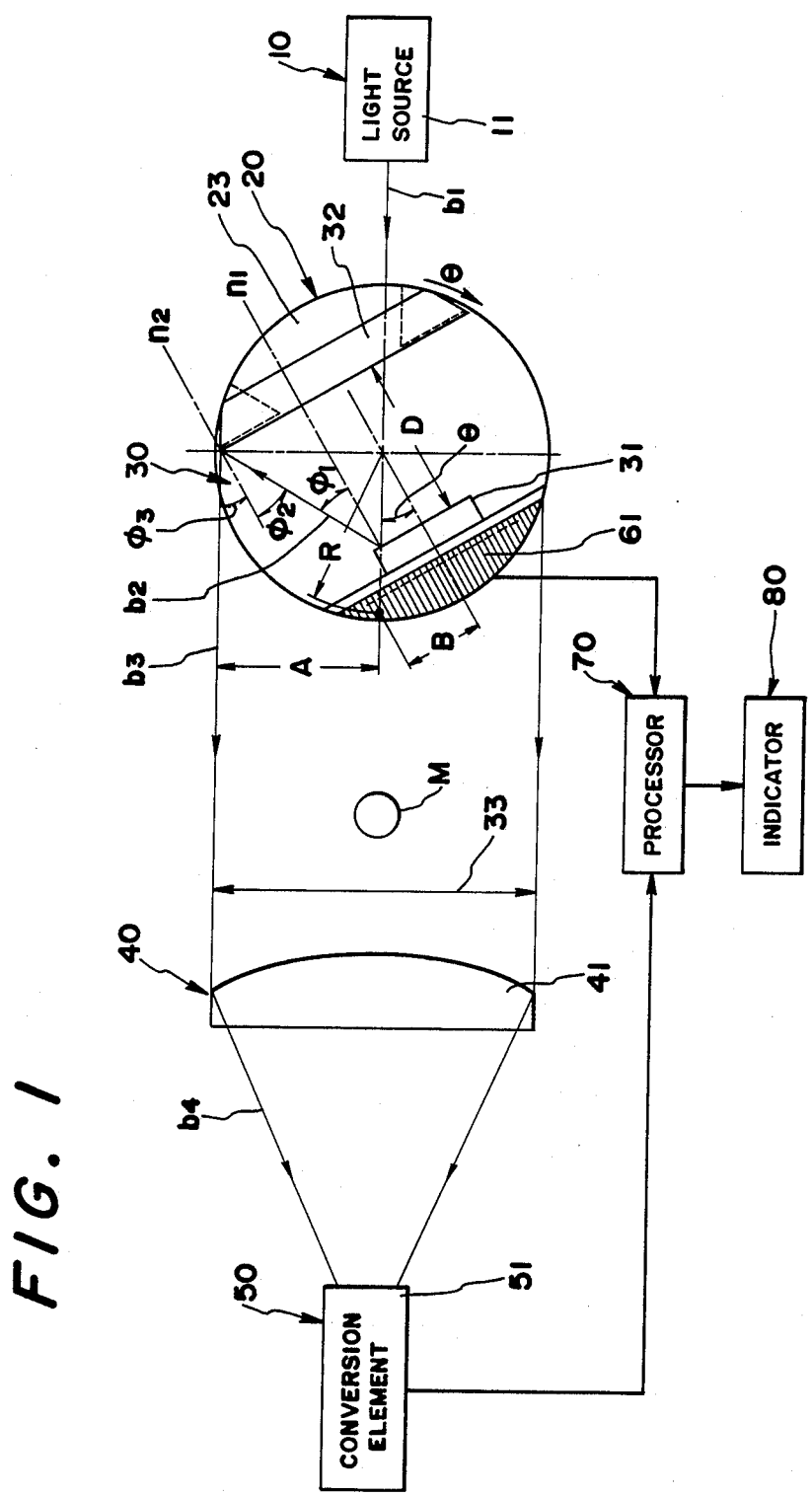
FIG. 1 is an explanatory diagram outlining the optical measuring apparatus according to the present invention.
Figure 2:
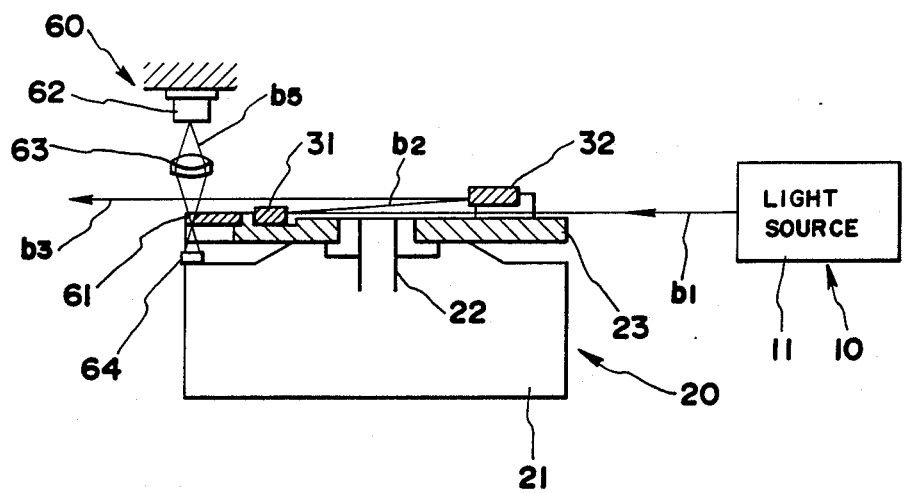
FIG. 2 is a cross sectional view of a main portion of the measuring apparatus of FIG. 1.
Figure 3:
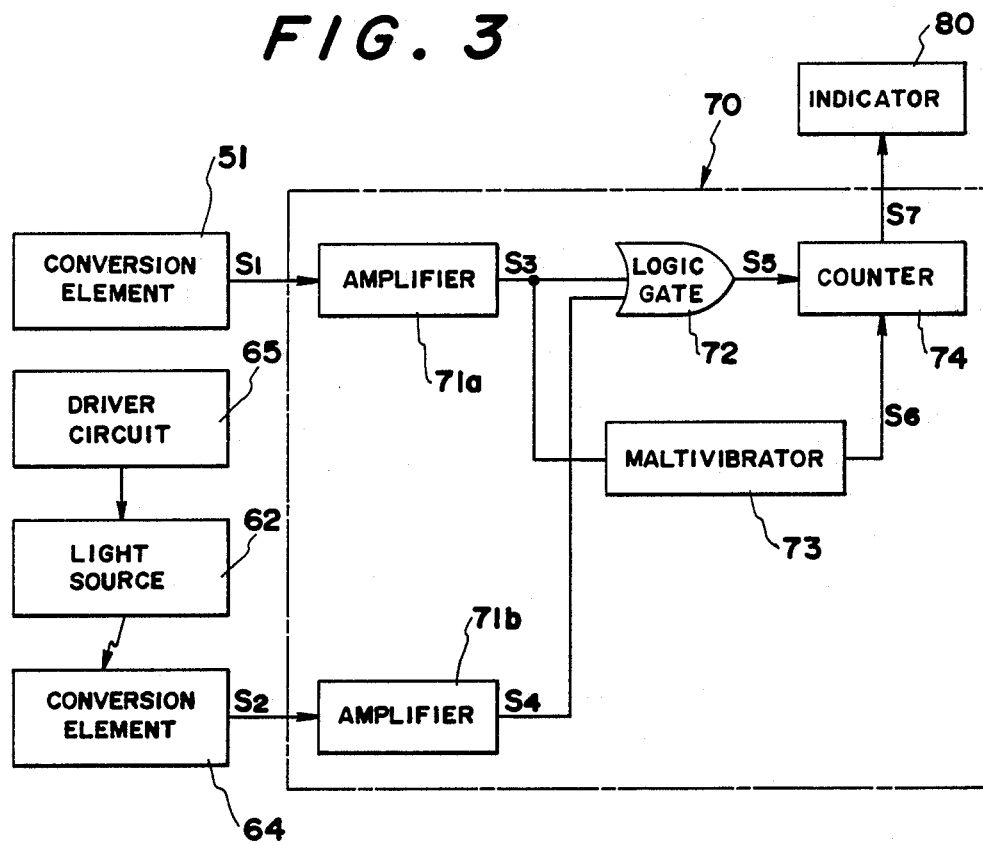
FIG. 3 is a block diagram showing the relationship between the electric signal processing section and the photoelectric conversion element in FIG. 1 in detail.
Figure 4:
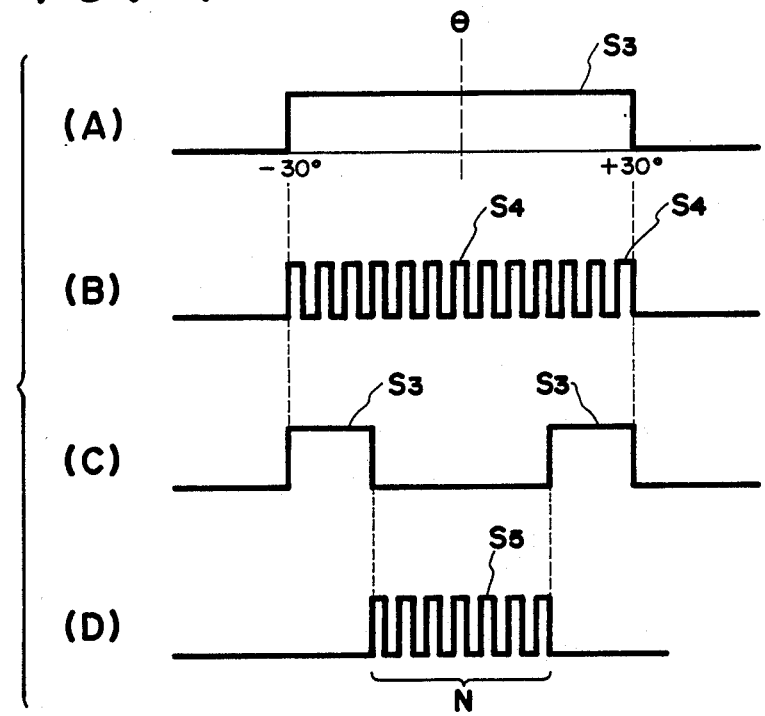
FIG. 4 is a timing chart for a description of operation of the electric signal processing section of FIG. 3.
Figure 5:
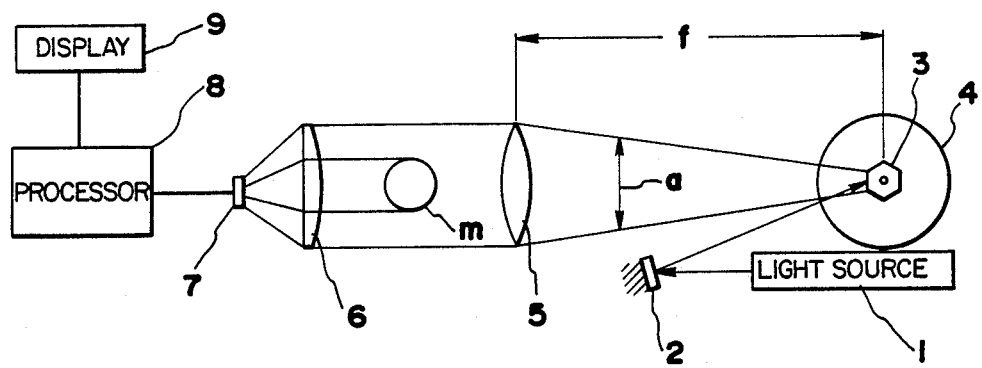
FIG. 5 is an explanatory diagram outlining the optical measuring apparatus of the prior art already referred above.

An example of a self-scanning type optical measuring apparatus constructed according to the present invention will be described with reference to FIGS. 1 to 4 of the accompanying drawings. Referring to FIGS. 1 to 3 of the drawings in greater detail, there is shown an optical measuring apparatus embodying the present invention.

As illustrated, the optical measuring apparatus comprises, substantially, a light source section 10, a driving section 20 for rotation, a light scanning section 30 for scanning a light to an object M to be measured, a focussing section 40 for focussing a scanning light produced by the scanning section 30, an electric signal generating section 50 for converting a scanning light signal to an electric signal, a measuring reference signal generating section 60 for generating a measuring reference signal in synchronous with the scanning operation of the light scanning section 30, an electric signal processing section 70 produced by the electric signal generating section 50, and an indicating section 80 for the dimension of the object M to be measured.

In more detail, the light source section 10 comprises a first light source in the form of a laser light generator 11. The driving section 20 includes a drive motor 21 and a supporting plate 23 fastened to a rotation shaft 22 of the drive motor 21. The optical scanning section 30 comprises a first mirror 31 mounted on the supporting plate 23 and a second mirror 32 mounted on the supporting plate 23 and positioned spaced apart at the distance D from the first mirror 31 such that a reflecting surface of the second mirror 32 is parallely opposed to a reflecting surface of the first mirror 31. As shown in FIG. 2, the second mirror 32 is positioned so as to be slightly vertically displaced with respect to the first mirror 31. The focussing section 40 includes a focussing lens 41 which is arranged spaced apart from the light scanning section 30 on a light path of the light scanning section 30 and focusses the scanning parallel light produced by the light scanning section 30.

The electric signal generating section 50 comprises a photoelectric conversion element 51 which is composed of a plurality of small photoelectric detecting elements arranged in a low. The photoelectric conversion element is arranged and positioned spaced apart at a predetermined distance from the focussing lens 41. The photoelectric detecting elements are arranged at positions corresponding to the parts of an optical intensity distribution which is provided by the light detecting element array and a charge is accumulated in the photoelectric elements in the amount corresponding to the quantity of the received light. The photoelectric detecting elements are scanned by the scanning lights, in a manner to be described later.

The measuring reference signal generating section 60 comprises a laser diode 62, a transparent scale boad in the from of a glass scale 61 mounted on the supporting plate 23 of the rotating section 20, a second light source in the form of a laser diode 62 which is fixedly arranged at an upper side of a rotating track of the glass scale 61 spaced apart from the glass scale 61, a second focussing lens 63 fixedly arranged between a tracking plane of the glass scale 61 and the laser diode 62 and a second photoelectric conversion element 64 fixedly arranged on a fixed portion of the drive motor 21.

The electric signal processing section 70 is electrically connected to the photoelectric conversion element 51 of the electric signal generating section 50 and the second photoelectric conversion element 64 of the measuring reference signal generating section 60 to process the electric signals from the first and second photoelectric conversion elements. The displaying section 80 is electrically connected in order to display the dimension of the object M to be measured as will be described later in detail. As is shown in FIG. 3, the electric signal processing section 70 comprises a first amplifier 71a electrically connected to the first photoelectric conversion element 51 of the electric signal generating section 50, a second amplifier connected to the second photoelectric conversion element 64 of the measuring reference signal generating section 60, a logic gate 72 inputting a signal S3 from the first amplifier 71a and a signal S4 from the second amplifier 71b, a one-shot multivibrator 73 inputting the signal S3 from the first amplifier 71a and a counter 74 inputting a logic signal S5 from the logic gate 72 and a signal S6 from the one-shot multivibrator 73.

In operations, a laser light beam b1 is projected from the laser light generator 11 of the first light source 10 toward a rotation center of the supporting plate 21 of the driving section 20. When the first mirror 31 together with the second mirror 32 of the light scanning section 30 is rotated at a predetermined rotation angle θ by the drive motor 21 of the rotating section 20, the laser light beam b1 is incidenced to the reflecting surface of the first mirror 31. The incidenced laser light beam b1 is reflected by the first mirror 31 at a reflection angle φ1 with respect to a normal line n1 of the reflecting surface of the first mirror 31. The reflecting light beam b2 incidences to the second mirror 32 at an incidencing angle $\phi 2$ with respect to a normal line n2 of a reflecting surface of the second mirror 32. The incidenced light beam b2 is further reflected by the second mirror 32 at a reflection angle $\phi 3$ to produce a parallel scanning light beam b3.

The incidencing position of the laser light beam b1 is shifted according to the variation of the rotation angle $\theta$ of the supporting plate 23 of the driving section 20. By the variation of the incidencing position of the laser light beam b1, the reflection angle $\phi 1$ of the reflecting light beam b2 is also changed because the incidencing angle of the laser light beam b1 varies. When the reflection angle $\phi 1$ of the reflecting light beam b2 is varied, the incidencing angle $\phi 2$ is varied and an incidencing position on the second mirror 32 is shifted. The reflection angle $\phi 3$ of the light beam b3 is also varied in accordance with the variations of the incidencing angle $\phi 2$ and the incidencing position on the second mirror 32. The reflecting light beam b3 is parallely shifted according to the rotation angle $\theta$ of the supporting plate 23 since the second mirror 32 is arranged such that the reflecting surface of the second mirror 32 is parallely opposed to the reflecting surface of the first mirror 31 and such that the second mirror 32 is rotated in synchronism with the first mirror. The parallel shift of the light beam forms a parallel scanning light flux.

The parallel light beam b3 is focussed by the focussing lens 41 to project a focussed light on a surface of the photoelectric conversion element 51 of the electric signal generating section 50. When the focussed light beam b4 is incidenced on the photoelectric conversion element 51, the element 51 generates the electric signal S1.

During the rotation of the second and first mirrors 31 and 32, the laser light beam b1 from the laser light generator 11 periodically incidences on the reflecting surface of the first mirror 31. Namely, when the rotation angle $\theta$ of the supporting plate 23 and the first mirror 31 is the predetermined range, the laser light beam b1 is incidenced on the reflecting surface of the first mirror 31. While the rotation angle of the first mirror 31 is $(2n\pi - \theta)$ radian, the light beam b1 is not incidenced on the reflecting surface of the first mirror 31.

Accordingly, when the first and second mirrors 31 and 32 are rotated together with the glass scale 61, the incidencing angle $\phi 1$ of the laser light beam b1 is varied and thereby the incidencing angle $\phi 2$ of the reflecting light b2 from the first mirror 31 is varied, resulting that the parallel scanning light b3 is parallely shifted to form the parallel scanning light flux 33. A scanning region A of the parallel scanning flux 31 can be represented by an equation $A = 2D \sin \theta$. While an incidencing region B of the light beam b5 from the laser diode 62 to the glass scale 61 can be represented by an equation $B = R \sin \theta$ and further a relation of A and B can be represented by an equation $A/B - 2D/R$, where R is the distance between a focussed point of the light beam b5 from the laser diode 62 and a rotation center point of the glass scale 61. The measuring accuracy can be enhanced by slightly adjusting the distance R.

In the measuring reference signal generating section 60, the laser diode 62 projects a laser light beam b5 toward the second focussing lens 63. A processed light from the focussing lens 63 is incidenced on the second photoelectric conversion element 64 through the glass scale 61. The glass scale 61 is also rotated by the drive motor 21 of the driving section 20 in synchronism with the first and second mirrors 31 and 32 of the light scanning section 30. The glass scale is, therefore, periodically traverses and passes across the light beam b5, and the light beam b5 is intermittently interrupted. When the light beam b5 is intermittently interrupted, the second photoelectric conversion element 64 generates an electric pulse signal S2 as a measuring reference signal. The pulse signal from the element 64 is supplied to the electric signal processing section 70.

As is shown in FIG. 3, the electric signal S1 from the first photoelectric conversion element 51 is supplied to the first amplifier 71a of the electric signal processing section 70. On the other hand, the laser diode 62 is driven by a driver circuit 65 to generate the light beam, and the electric signal S2 is supplied to the second amplifier 71b. The amplified electric signal S3 from the first amplifier 71a is supplied to the logic gate 72 and the one-shot multivibrator 73. The amplified electric signal S4 is supplied to the logic gate 72. The logic signal S5 from the logic gate 72 is supplied to the counter 74 to activate the counter 74. On the other hand, the rest pulse signal S6 from the one-shot multivibrator 73 supplied to the counter 74 to control the counter 74.

When the object M to be measured is not set in the measuring instrument, the output signal S3 becomes a gate pulse of which pulse width is $\theta \pm 30°$ as shown in FIG. 4A, during the first mirror 31 receives the laser light beam b1 from the laser light generator 11. On the other hand, when the light-beam b5 is intermittently interrupted by the glass scale 61, the output signal S2 becomes a pulse modulation signal as shown in FIG. 4B, and an equation $d\theta/dt = K \cos\theta$ can be obtained where K is constant value. Under these conditions, the output signal S3 of the first amplifier 71a and the output signal S4 of the second amplifier 71b are led to the logic gate 72, and thereby the output signal S5 becomes "0" of the logic signal. The output signal of the first amplifier 71a is also supplied to the one-shot multivibrator 73, and a reset pulse signal S6 is supplied to the counter 74. When the reset pulse signal S6 is supplied to the counter 74, the counter 74 becomes nonactivation state, and the countering operation cannot be performed.

When the object M to be measured is set in the optical measuring instrument, the logic signal "0" can be obtained in the output signal S3 of the first amplifier 71a corresponding to a shadow portion formed on the photoelectric conversion element 51 as shown in FIG. 4C, during the first mirror 31 receives the laser light beam b1 from the laser light generator 11 and the parallel scanning light beam b3 is incidenced on the object M. While the output signal S4 of the second amplifier 71b becomes pulse modulation signal as shown in FIG. 4B. Accordingly, the logical output signal S5 becomes pulse modulation signal as shown in FIG. 4D. Under these conditions, the reset signal S6 of the one-shot multivibrator 73 is released since the output signal S3 is low level "0". The pulse modulation signal from the logic gate 72 is supplied to the counter 74. The counter 74 calculates and processes the number N of pulses of the up-pulse signal S5 and supplys a displaying signal S7 to the indicating section 80 to indicate the dimension of the object M to be measured.

As is apparent from the above description, according to the present invention, a complete parallel scanning light beam can be obtained by projecting a light beam to one of two mirrors which are rotated in synchronism with each other, and a measuring reference signal can be obtained by a transparent scale boad rotated in synchronism with the mirrors. Accordingly, the compensation of the aberation and the amendment of trigonometric are not required since the accurate measuring reference signal can be obtained by a measuring reference generating section. Moreover, a high performance and inexpensive measuring apparatus can be obtained, since a measuring precision is enhanced without a synchronous signal generating circuit is not required due to the synchronization of a scanning light and a measuring reference signal.

It will be apparent to those skilled in the art that modifications and/or changes may be made in an illustrated embodiment without departure from inventive concepts manifested thereby. Accordingly, it is expressively intended that the foregoing descriptions are of an preferred embodiment only, not limiting and that the true spirit and scope of the present invention be determined by reference to the appended claims.

What is claimed is:

1. The optical measuring apparatus comprising:
   a first light source for generating a light beam;
   a driving section for rotation including a drive motor and a supporting member rotated by the drive motor;
   a light scanning section for providing a parallel scanning light flux, including a first mirror fixed mounted on said supporting member of the driving section periodically receiving the light beam from said first light source and a second mirror fixedly arranged on said supporting member horizontally vertically displaced from the first mirror such that a reflecting surface of the second mirror being parallely opposed to a reflecting surface of the first mirror, the first mirror and the second mirror being synchronously rotated by said drive motor of the driving section;
   a focussing section including a first focussing lens for focussing a parallel scanning light beam produced by said light scanning section, being arranged on a light path of the parallel scanning light beam;
   an electric signal generating section including a first photoelectric conversion element for converting a focussed light beam focussed by said focussing lens of the focussing section to an electric signal;
   a measuring reference signal generating section for generating a measuring reference signal in synchronism with the generation of the parallel scanning light, said measuring reference signal generating section including a transparent scale having a plurality of scaling marks and fixedly mounted on said supporting member of the driving section together with said first and second mirror of the light scanning section, a second light source fixedly arranged spaced apart from a rotation tracking plane, a second focussing lens fixedly positioned on a light path of a light beam between the second light source and the rotation tracking plane and a second photoelectric conversion element fixedly arranged opposed to the second focussing lens with respect to the rotation tracking plane spaced apart from the second focussing lens at a predetermined distance;
   an electric signal generating section for processing said electric signal of the electric signal generating section and said measuring reference signal of the measuring reference signal generating section to produce a measuring signal of the object to be measured and;
   an indicating section for indicating a dimension of the object based on said measuring signal of said electric signal generating section.

* * * * *